United States Patent
Jones et al.

(10) Patent No.: US 7,200,397 B1
(45) Date of Patent: Apr. 3, 2007

(54) METHOD AND SYSTEM FOR DETERMINING AVAILABILITY OF A RADIO NETWORK

(75) Inventors: Bryce A. Jones, Overland Park, KS (US); Jason R. Delker, Olathe, KS (US); John M. Everson, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 441 days.

(21) Appl. No.: 10/629,406

(22) Filed: Jul. 29, 2003

(51) Int. Cl.
*H04Q 7/32* (2006.01)
*H04Q 7/20* (2006.01)

(52) U.S. Cl. .................. 455/436; 455/437; 455/440; 455/432.1; 455/434; 455/422.1; 455/550.1; 455/426.1; 370/331; 370/332; 370/333; 370/334

(58) Field of Classification Search .............. 455/436, 455/437, 438, 439, 440, 441, 432.1, 432.2, 455/435.1, 435.2, 426.1, 426.2, 414.1, 414.2, 455/414.4, 422.1, 403, 550.1, 552.1, 553.1, 455/500, 517, 442, 443, 444, 445, 434; 370/331, 370/332, 333, 334
See application file for complete search history.

(56) References Cited

U.S. PATENT DOCUMENTS

| | | | |
|---|---|---|---|
| 5,737,703 A | 4/1998 | Byrne | ............... 455/442 |
| 5,943,621 A * | 8/1999 | Ho et al. | ............... 455/456.3 |
| 6,438,117 B1 | 8/2002 | Grilli et al. | ............... 370/331 |
| 6,463,298 B1 * | 10/2002 | Sorenson et al. | ......... 455/552.1 |
| 6,680,923 B1 | 1/2004 | Leon | ............... 370/328 |
| 2001/0036830 A1 | 11/2001 | Wu et al. | ............... 455/436 |
| 2002/0027891 A1 * | 3/2002 | Mimura | ............... 370/331 |
| 2002/0132628 A1 * | 9/2002 | Matsumoto et al. | ......... 455/456 |
| 2002/0191575 A1 * | 12/2002 | Kalavade et al. | ............ 370/338 |
| 2003/0091021 A1 | 5/2003 | Trossen et al. | ............... 370/349 |
| 2004/0264414 A1 * | 12/2004 | Dorenbosch | ............... 370/332 |

* cited by examiner

*Primary Examiner*—Keith Ferguson

(57) ABSTRACT

A mobile station communicating with a first radio network may detect that it has changed location and thereafter stopped moving. In response to determining that it has changed location and thereafter stopped moving, the mobile station may perform one or more predetermined actions. For example, the mobile station may be communicating with a first radio network, such as a WWAN. In response to this determination, the mobile station may check the availability of a second radio network, such as a WLAN. If the second radio network is available, the mobile station may begin accessing the second radio network for voice, data or other services.

23 Claims, 9 Drawing Sheets

METHOD AND SYSTEM FOR DETERMINING AVAILABILITY OF A RADIO NETWORK

FIELD OF THE INVENTION

This invention relates generally to radio networks. More specifically it relates to a method for triggering the mobile station to perform various actions, such as determining the availability of a radio network.

BACKGROUND OF THE INVENTION

A mobile station may communicate with a first radio network, such as a wireless wide area network ("WWAN") or other radio network. The mobile station may communicate with other devices on the first radio network. The first radio network may additionally provide connectivity to one or more other networks, such as packet data networks, thereby allowing the mobile station to also communicate with devices on these other networks.

In addition to the first radio network, the mobile station may also communicate with a second radio network, such as a wireless local area network ("WLAN") that uses one of the various Institute of Electrical and Electronics Engineers ("IEEE") 802.11 protocols. The mobile station may connect to the second radio network and then communicate with other devices on the second radio network. The second radio network may additionally provide connectivity to other networks, such as packet data networks. The mobile station may then also communicate with devices on these other networks.

The mobile station may communicate with one or both of the radio networks, which can provide the mobile station with voice, data or other services. Although both radio networks may provide the mobile station with one or more of these services, it may still be preferable for the mobile station to communicate with one of these radio networks over the other radio network. For example, the second radio network may provide the mobile station with higher data speeds or lower access charges. Thus, given a choice between the two radio networks, it may be preferable for the mobile station to communicate with one radio network over the other network. Therefore, even when the mobile station is communicating with the first radio network, the mobile station may still want to determine the availability of the second radio network so that the mobile station can begin communicating with the second radio network when it is available.

Current methods for detecting the availability of a radio network have various limitations. In one method of detecting the availability of a radio network, a user of the mobile station manually prompts the mobile station to check the availability of the radio network. For example, in response to a command from the user, the mobile station may check for the availability of the radio network. This can disadvantageously create a delay in detecting the availability of the radio network, because while the mobile station may be within range of the radio network, the mobile station would only detect the radio network in response to a command from the user prompting the mobile station to check for the radio network. A delay in making the request would cause a delay in detecting the radio network's availability, and if the user doesn't even make a request, then the mobile station would not ever detect the radio network's availability and may lose existing radio network connectivity.

In another method of detecting the availability of the radio network, the mobile station may automatically check for the availability of the radio network, such as at predetermined time intervals. The mobile station may include, for example, a radio or other transceiver that the mobile station uses to communicate with the radio network. In order to check for the availability of the radio network, the mobile station may power-up the radio and then use the radio to attempt to communicate with the radio network. If the radio network is not available, the mobile station may power-down the radio until the next predetermined interval when the mobile station again checks for the availability of the radio network. However, powering-up and powering-down the radio in the mobile station in this manner consumes battery power, which can be undesirable for battery-powered mobile stations. Similarly, continually leaving the radio rather than periodically powering it up and down may also consume battery power and therefore be undesirable.

Therefore, there exists a need for other methods for determining the availability of a radio network.

SUMMARY OF THE INVENTION

A mobile station communicating with a first radio network may use location changes to aid in determining when to perform various events. For example, the mobile station may change location and thereafter determine that it has stopped moving. In response to this determination, the mobile station may perform one or more actions. In one embodiment, if the mobile station changes location and thereafter stops moving, the mobile station may then check for the availability of the second radio network. If the second radio network is available, the mobile station may begin communicating with the second radio network. If the second radio network is not available, then the mobile station may check the availability of the second radio network again at a later time.

In one aspect, the first radio network may be a WWAN and the second radio network may be a WLAN. The mobile station may communicate with a plurality of base stations in the WWAN, such as by being served by one of the base stations and monitoring pilot signals from the other base stations. As the mobile station changes location, it may detect pilot signals from additional base stations not in the plurality of base stations, it may stop detecting a pilot signal from a base station in the plurality of base stations, it may detect a change in the relative strengths of the pilot signals or it may handoff between base stations.

As the mobile station detects that it is changing location and has thereafter stopped moving, the mobile station may then attempt to communicate with the WLAN. If the mobile station has moved within range of the WLAN, the mobile station may then use the WLAN for voice, data or other services. If the mobile station is not within range of the WLAN, the mobile station may attempt to communicate with the WLAN again at a later time.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Overview

Figure 1:
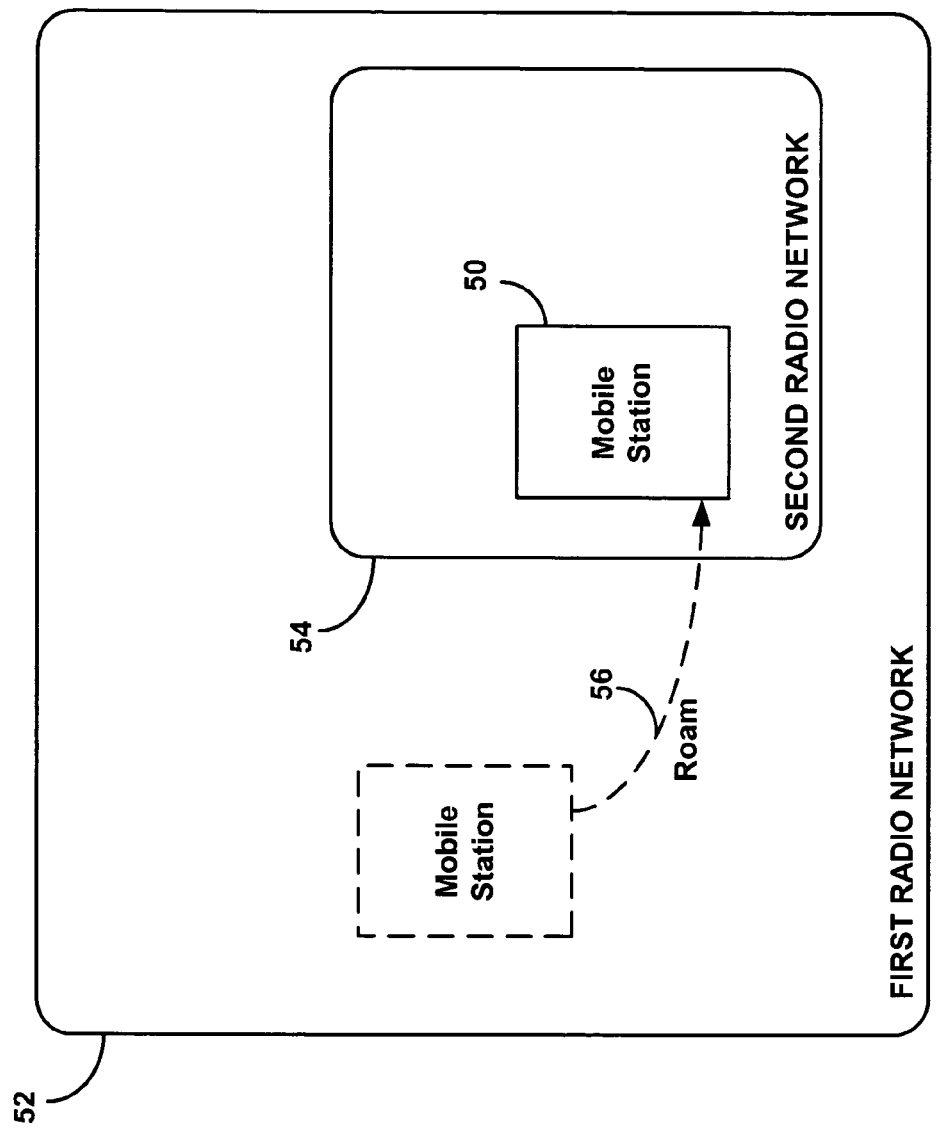
FIG. 1 is an exemplary illustration of a mobile station that can communicate with first and second radio networks.

FIG. 1 is an exemplary illustration of a mobile station 50 that can communicate with a first radio network 52 and a second radio network 54. The mobile station 50 may communicate with other devices on the first or second radio networks 52, 54 in order to exchange voice, data or other types of information. The first and second radio networks 52, 54 may optionally provide connectivity to other networks, thereby also allowing the mobile station 50 to communicate with devices on those other networks. The first and second radio networks 52, 54 may be any type of radio networks. For example, the first radio network may be a WWAN. The second radio may be, for example, a WLAN. These are merely examples, and any other type of wireless network may be used for the first and second wireless networks 52, 54.

The mobile station 50 may move among various different locations, and the mobile station 50 may use a change in location as a trigger to perform one or more actions. For example, the mobile station 50 may determine that it has changed location but has currently stopped moving. In response to this determination, the mobile station 50 may perform one or more different actions. Thus, the determination that the mobile station 50 has changed location and then stopped moving may serve to trigger the mobile station 50 to perform one or more other actions. Alternatively, the mobile station 50 might use the determination that it has started to change location or that it has changed location as trigger to perform one or more actions without having to also determine that it has thereafter stopped moving.

In one embodiment, the mobile station 50 might check for the availability of the second radio network 54 after making this determination. For example, the mobile station 50 may move from a position outside the coverage area of the second radio network 54 to a position inside the coverage area of the second radio network 54, as shown by a dashed line 56. The mobile station 50 may then detect that it has changed location and thereafter stopped moving. In response to this determination, the mobile station 50 may then attempt to determine if it has moved within range of the second radio network 54, such as by attempting to communicate with the second radio network 54. If the mobile station 50 successfully communicates with second radio network 54, then the mobile station may begin using the second radio network 54 to provide voice, data or other services, otherwise the mobile station 50 might continue communicating with the first radio network 52.

In this embodiment, the mobile station 50 checks for the availability of the second radio network after determining that it has changed location and stopped moving, thereby increasing the likelihood that the mobile station 50 might have moved within range of the second radio network 54. Checking for the availability of the second radio network 54 in response to a change in the mobile station's location may allow the mobile station 50 to more efficiently switch between radio networks 52, 54 in order to leverage the radio network with the highest data speed, lowest cost or some other preferable factor. This might also conserve the mobile station's resources, such as battery power and computational overhead, over a scheme that checks for the second radio network's availability at predefined intervals without regard to whether the mobile station 50 might have moved within range of the second radio network 54 since the mobile station 50 last checked for the second radio network's availability. Other advantages may also exist.

2. Exemplary Architecture

Figure 2:
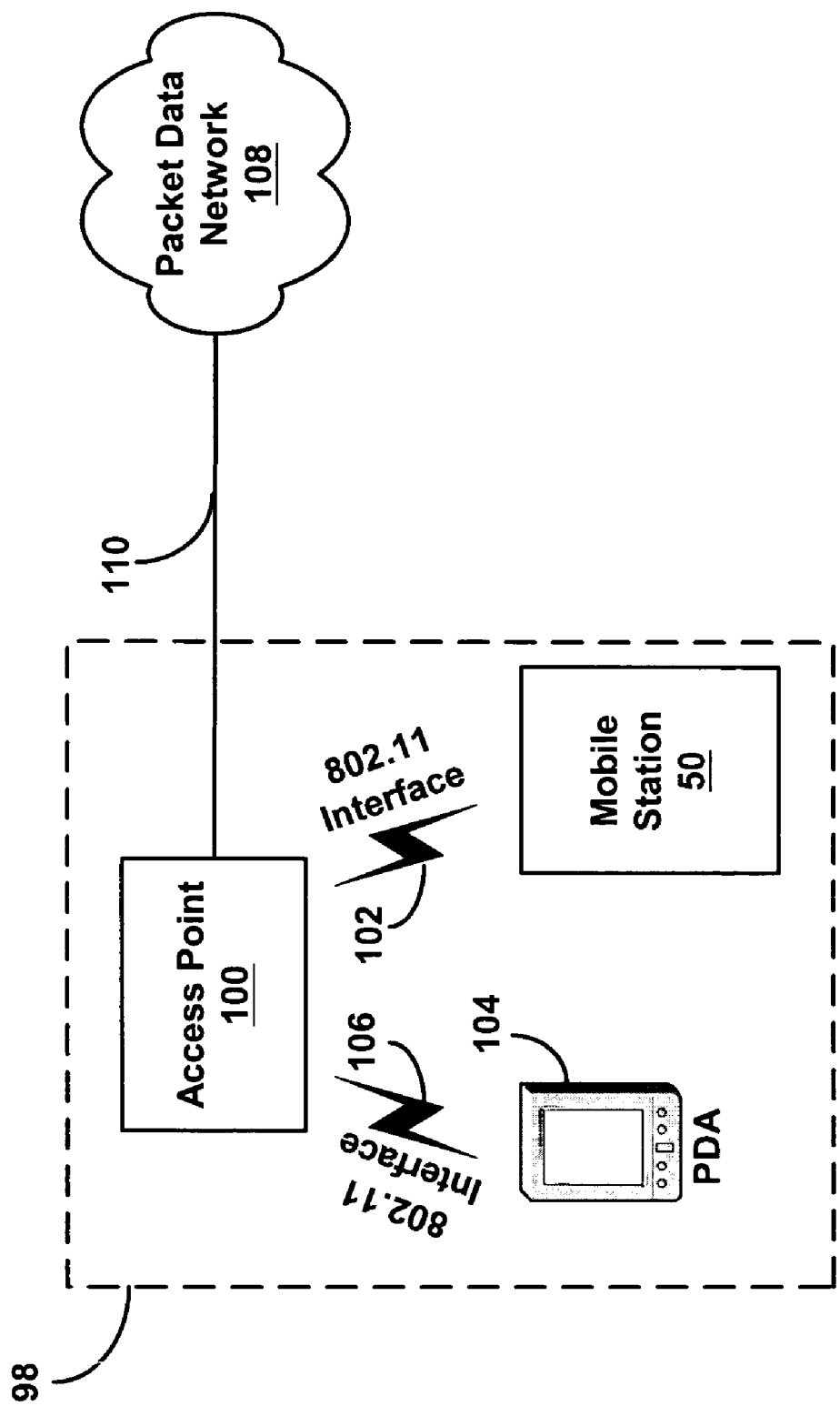
FIG. 2 is an exemplary WLAN that can be used as the second radio network of FIG. 1.

FIG. 2 is an exemplary WLAN that can be used as the second radio network 54 of FIG. 1. The devices on the WLAN 98 may communicate using one or more of the various IEEE 802.11 standards. IEEE 802.11 specifies various signaling and formatting protocols that are used by devices on the WLAN 98. For example, IEEE 802.11 provides protocols for a physical ("PHY") layer, which is used to transmit bits of information over a wireless interface. IEEE 802.11 also defines a media access control ("MAC") sub-layer, which can be used to format the bits sent over the wireless interfaces using one of the PHY layer protocols.

The WLAN 98 is depicted in a basic service set ("BSS") configuration. In the BSS configuration, one or more wireless nodes connect with an access point ("AP") 100. As depicted in FIG. 2, the WLAN 98 includes two wireless nodes. The mobile station 50 serves as one wireless node and communicates with the AP 100 over an 802.11 wireless interface 102. The mobile station 50 may be any number of different devices, such a mobile phone, two-way pager, two-way radio, personal digital assistant, Internet appliance, wirelessly-equipped computer or any other wireless device.

As depicted in FIG. 2, a personal digital assistant ("PDA") 104 serves as the second wireless node and communicates with the AP 100 over an 802.11 wireless interface 106. Other types of devices may also serve as wireless nodes. Although FIG. 2 only depicts two wireless nodes 50, 104, the WLAN 98 may include a greater or fewer number of wireless nodes.

In the BSS configuration, the wireless nodes 50, 104 can exchange data with each other through the AP 100. For example, the PDA 104 can send messages to the mobile station 50, and those messages may be routed through the AP 100. Similarly, the mobile station 50 may send messages to the PDA 104, and those messages may also be routed through the AP 100. Other devices communicating with the AP 100 may exchange messages in a similar manner.

In addition to the BSS configuration, multiple APs can be linked together to form an extended services set ("ESS"). Thus, an ESS can include two or more BSSs. The APs can be linked in a variety of different manners, such as through a wired Ethernet connection. Once linked together, wireless nodes connected to one AP can exchange data with wireless nodes connected to a different AP. Additionally, a wireless node can roam among the different wireless access points in the ESS. Thus, an ESS configuration can extend the range of the WLAN 98 past that of a BSS configuration.

The AP 100 may in turn connect to a packet data network 108 via a data link 110. The data link 110 may be a wired or wireless connection. The packet data network 108 may be any type of packet data network, such as an intranet or the Internet. The packet data network 108 may additionally provide connectivity to one or more other packet data networks. Using the connectivity between the AP 100 and the packet data network 108, the mobile station 50 may communicate with a device on the packet data network 108.

The WLAN 98 depicted in FIG. 2 may use any of the various 802.11 standards. For example, it may use the 802.11a, 802.11b, 802.11g or other standards under the 802.11 umbrella. It should be understood, however, that IEEE 802.11 is merely exemplary in nature. The second radio network 54 may use other radio protocols. For example, the second radio network 54 may alternatively be a HomeRF network, a HiperLAN, a Bluetooth network, a multichannel multipoint distribution service ("MMDS") network, a digital enhanced cordless telecommunications ("DECT") network, a WWAN or another type of radio network.

Figure 3:
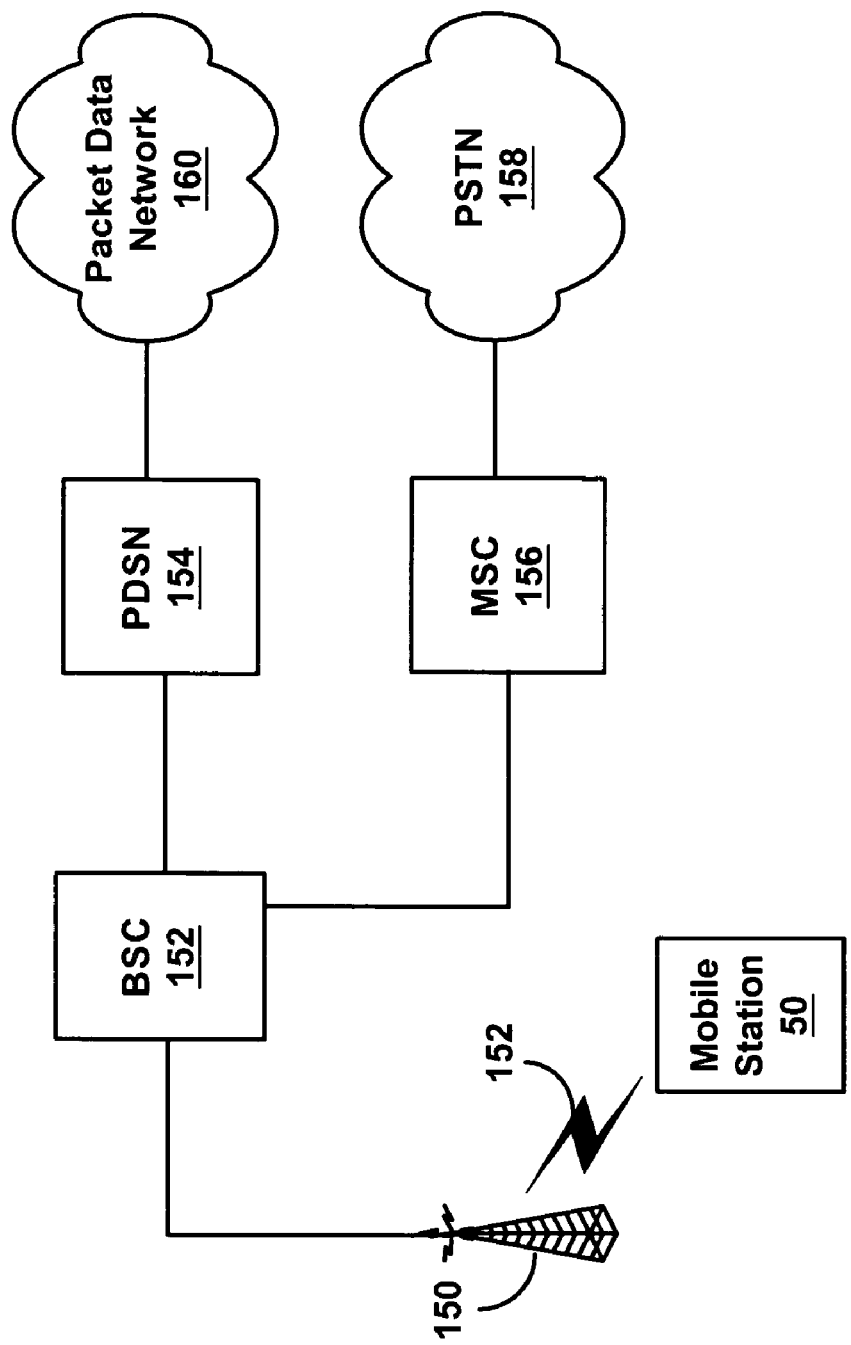
FIG. 3 shows an exemplary architecture for a WWAN that can be used as the first radio network of FIG. 1.

FIG. 3 shows an exemplary architecture for a WWAN that can be used as the first radio network of FIG. 1. As shown in FIG. 3, the mobile station 50 communicates with a base transceiver station ("BTS") 150 via an air interface 152. The mobile station 50 can communicate with the BTS 150 using a variety of different protocols. In one exemplary embodiment, the mobile station 50 communicates with the BTS 150 via the air interface 152 using Code Division Multiple Access ("CDMA").

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other wireless protocols may also be used. For example, the mobile station 50 and the base station 150 may communicate using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), IS-136, Time Division Multiple Access ("TDMA"), IEEE 802.11, Bluetooth, MMDS, DECT, integrated digital enhanced network ("IDEN") or other protocols.

The BTS 150 connects to a base station controller ("BSC") 152, which in turn connects to a packet data serving node ("PDSN") 154. The PDSN 154 connects to a packet data network 160. Using this connectivity, the mobile station 50 may then communicate with devices on the packet data network 160. Alternatively, the mobile station 50 might use an Internetworking Function ("IWF") in order to engage in packet data communications with another device one on the WWAN or on the packet data network 160. Depending on the particular type of WWAN, other methods might also be used to provide the mobile station 50 with access to the packet data network 160.

Alternatively, the mobile station 50 may access the WWAN by placing a traditional voice call. The BSC 152 may connect to a mobile switching center ("MSC") 156, which in turn may connect to the public switched telephone network ("PSTN") 158. The mobile station 50 may use this connectivity to form a circuit-switched connection with another device on the PSTN. The mobile station 50 may then send voice traffic to the other device over this connection; however, the mobile station 50 may also send data over this type of connection. Other types of circuit-switched connections may be used.

It should be understood, however, that the wireless networks depicted in FIGS. 2 and 3 are merely exemplary in nature. For example, it is not necessary that the first radio network 52 is a WWAN, rather the first radio network 52 may be another type of WWAN or it may be any other type of radio network. Also, it is not necessary that the second radio network 54 be a WLAN. The second radio network 54 may alternatively be any other type of radio network. It is also not necessary that one particular radio network have a larger coverage area than the other radio network, and it is not necessary that the mobile station 50 be able to communicate with two radio networks. In alternate embodiments, the mobile station 50 may communicate with a greater or fewer number of radio networks.

Figure 4:
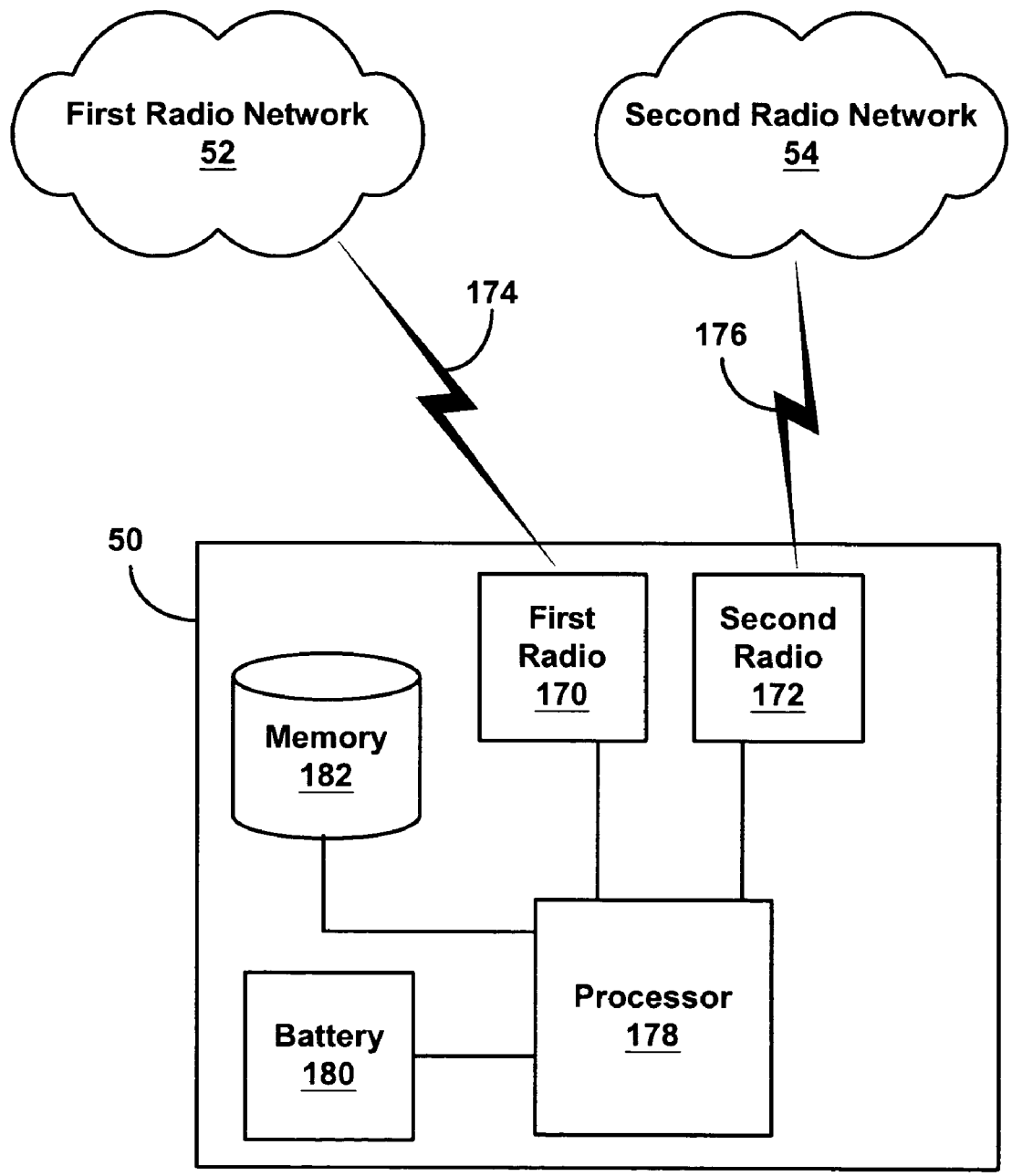
FIG. 4 is a block diagram illustrating exemplary components in the mobile station that can be used to communicate with the first and second radio networks of FIG. 1.

FIG. 4 is a block diagram illustrating exemplary components in the mobile station that can be used to communicate with the first and second radio networks 52, 54 of FIG. 1. As shown in FIG. 4, the mobile station 50 includes a first radio 170 for communicating with the first radio network 52 via a first wireless interface 174. The mobile station 50 also includes a second radio 172 for communicating with the second radio network 54 via a second wireless interface 176. The radios 170, 172 may vary with the types of the first and second radio networks 52, 54.

As previously described, in one exemplary embodiment the first radio network 52 is a WWAN and the second radio network 54 is a WLAN. Thus, the first radio 170 may be a WWAN radio and the second radio 172 may be a WLAN radio. Thus, the first wireless interface 174 may be the air interface 152 of FIG. 3, and the second wireless interface 176 may be the 802.11 interface 102 of FIG. 2. However, the particular types of wireless interfaces 174, 176 may vary with the particular types of radio networks.

The radios 170, 172 may be separate components in the mobile station 50. For example, they may be separate application specific integrated circuits ("ASICs"), antenna systems or other separate components. Alternatively, the radios 170, 172 may be integrated into a single ASIC, such as a dual mode ASIC. The radios 170, 172 may also be integrated into a single component in the mobile station 50 other than an ASIC. Although FIG. 4 depicts two radios 170, 172 in the mobile station 50, the mobile station 50 may include a greater or fewer number of radios. Thus, the mobile station 50 may communicate with a greater or fewer number of radio networks.

In one exemplary embodiment, the first radio 170 is a WWAN radio module capable of communicating using CDMA. Once connected to the mobile station 50, the mobile station 50 can use the WWAN radio module to communicate with a WWAN. In another exemplary embodiment, the second radio 172 is a WLAN radio module capable of communicating using the IEEE 802.11 protocol. These radio modules are merely exemplary in nature, and the mobile station 50 may include radio modules that can communicate with a variety of other types of radio networks.

The radio modules may connect to the mobile station 50 in a variety of different ways. For example, radio modules may connect to the mobile station 50 through a serial port, a parallel port, a Personal Computer Memory Card International Association ("PCMCIA") slot, a Universal Serial Bus ("USB") port, a SD slot, a compact flash slot, a firewire connection or another type of connection. Thus, the radio modules may be removable such that a user of the mobile station 50 can add or remove radio modules in order to change the radio networks with which the mobile station 50 can communicate. Alternatively, the radio modules may be permanently connected to the mobile station 50 such that a user of the mobile station 50 cannot add or remove radio modules.

As illustrated in FIG. 4, a processor 178 connects to the first radio 170 and second radio 172 and may control their operation. The processor 178 may additionally control the operation of other components in the mobile station 50. The processor 178 may further interface with a battery 180, which supplies power to the processor 178 and other components in the mobile station 50. The processor 178 may also connect to memory 182, which can store programs, data or other information used by the processor 178.

In order to conserve the battery 180, the mobile station 50 may power-down the radios 170, 172 when the mobile station 50 is not communicating with their respective radio networks 52, 54. For example, the mobile station 50 may power-down the second radio 172 when the mobile station 50 is not communicating with the second radio network 54. Similarly, the mobile station 50 may power-down the first radio 170 when the mobile station 50 is not communicating with the first radio network 52. Even when the radios 170, 172 are included in a single chip, they may be separately powered-up and powered-down. In order to later access one of the networks, the mobile station 50 can then power-up the corresponding radio. For example, the mobile station 50 can power-up the first radio 170 to access the first radio network 52, and it can power-up the second radio 172 to access the second radio network 54.

3. Exemplary Operation

Figure 5:
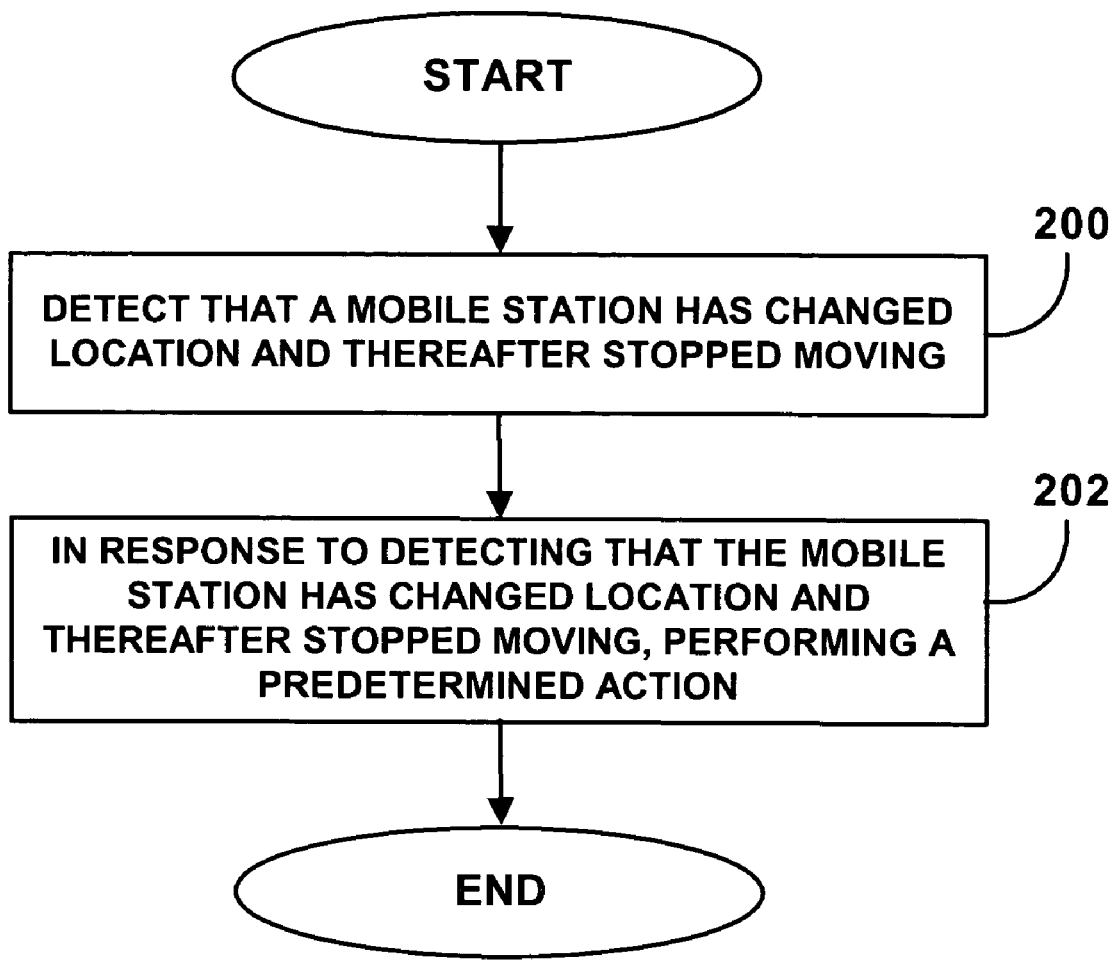
FIG. 5 is a flowchart of an exemplary process that a mobile station communicating with a first radio network can use to trigger events, such checking for an availability of a second radio network.

FIG. 5 is a flowchart of an exemplary process that a mobile station communicating with a first radio network can use to trigger events, such checking for an availability of a second radio network. At Step 200, the mobile station detects that it has changed location and thereafter stopped moving. The mobile station 50 may determine that it has changed location and thereafter stopped moving in a variety of different ways. And, the methods that the mobile station 50 uses to determine that it has changed location and thereafter stopped moving may vary depending on the types of radio networks with which the mobile station 50 can communicate.

For example, the first radio network 52 may be a WWAN. The mobile station 50 may actively communicate with a plurality of different base stations in the WWAN. The mobile station 50 may monitor the pilot signals of base stations in the plurality of base stations. The mobile station 50 may monitor the pilots signals from the base stations in order to determine which base station offers a sufficiently strong signal in the event the mobile station 50 attempts to establish a connection with the WWAN, such as to engage in a voice call, a data session or some other service offered by the WWAN.

A change in the location of the mobile station 50 may affect the signals the mobile station 50 receives from the plurality of base stations. By detecting the changes in signals received from the base stations, the mobile station 50 may thereby also detect that the mobile station 50 has changed location. For example, as the mobile station 50 changes location, it may move within range of a base station not within the plurality of base stations. Thus, the mobile station 50 may detect that it has changed location when it detects that it is communicating with an additional base station not in the plurality of base stations. For instance, the mobile station 50 might begin receiving pilot signals from a base station that is not in the plurality of base stations. The mobile station 50, however, is not limited to detecting pilot signals, rather the mobile station 50 might alternatively detect one or more other signals from the additional base station.

In another example, as the mobile station 50 changes location, it may move out of range of one of the base stations in the plurality of base stations. Thus, the mobile station 50 may detect that it has changed location by determining that it is no longer communicating with one of the base station in the plurality of base stations. For instance, the mobile station 50 might stop receiving a pilot signal from one of the base stations in the plurality of base stations. Alternatively, the mobile station 50 might stop receiving one or more other signals from a base station in the plurality of base stations.

As the mobile station 50 changes location, it might remain within range of all the base stations in the plurality of base stations. Thus, the mobile station 50 might change location but still continue to detect pilot signals from all the base stations in the plurality of base stations, and this may occur without the mobile station 50 moving within range of an additional base station not within the plurality of base stations. As the mobile station 50 changes location, however, the relative strengths of the pilot signals of base stations in the plurality of base station may change. The mobile station 50 might then detect that it has changed location by detecting a change in the relative strengths of pilot signals of base stations in the plurality of base stations.

In another example of detecting that the mobile station 50 has changed location, the mobile station 50 might currently be served by one of the base stations in the plurality of base stations. As the mobile station 50 changes location, it may be handed-off from one base station to another base station. The mobile station 50 may handoff to another base station in the plurality of base stations, or it might handoff to a base station that is not in the plurality of base stations. Thus, the mobile station 50 might detect that it has changed location by detecting a handoff of the mobile station 50 between base stations.

Using these various methods, the mobile station 50 may detect that it has changed location. The mobile station 50 may then detect that it has thereafter stopped moving in a variety of different manners. For example, the mobile station 50 may detect one of the previously described changes in signals and thereafter not detect another change in signals within a predetermined amount of time. Alternatively, the mobile station 50 might detect one of the previously described changes in signals but then detect that subsequent changes in signals, such as variations in the relative strengths of pilot signals, are within a predetermined tolerance. Still alternatively, the mobile station 50 might detect one of the previously described changes in signals and then simply wait a predetermined amount of time. Other methods might also be used to determine that the mobile station 50 has stopped moving after beginning to change locations.

It should be understood, however, that while the mobile station 50 may detect that it has stopped moving, the mobile station 50 might actually still be moving. For example, the mobile station 50 might detect that it has changed location by moving within range of a new base station, and the mobile station 50 may thereafter detect that it has stopped moving by determining it has not moved within range of yet another base station within a predetermined amount of time. While the mobile station 50 might not have moved within range of yet another base station within a predetermined amount of time, the mobile station 50 might continue to move within a coverage area of the other base station with which it is communicating. Thus, the mobile station 50 might continue to move within a smaller area but for purposes of triggering various events might nevertheless determine that it has stopped moving.

In another example, the mobile station 50 might detect that it has changed location by detecting a change in the relative strengths of pilot signals of one or more base stations with which the mobile station 50 is communicating. The mobile station 50 might then detect that is has stopped moving when the mobile station 50 has no longer detected a change in the relative strengths of the pilot signals within a predetermined amount of time, or the mobile station 50 might detect that the changes in the relative strengths of the pilot signals are within a predetermined tolerance. Therefore, there might be some change in the relative strength of the pilot signals as the mobile station 50 moves within a small area, but for purposes of determining whether to perform various events the mobile station 50 might determine that it has stopped moving.

In response to detecting that the mobile station 50 has changed location and stopped moving, the mobile station 50 may perform one or more actions, as shown at Step 202. In one embodiment, the mobile station 50 may check for an availability of the second radio network 54. The mobile station 50 may check the availability of the second radio network 54 immediately after detecting that the mobile station 50 has changed location and stopped moving, or, alternatively, the mobile station may 50 may wait a predetermined amount of time before checking the availability of the second radio network 54. Other variations are also possible.

In another embodiment, the mobile station 50 may check the availability of the second radio network 54 if the mobile station 50 has not changed location within a predetermined amount of time. Thus, once the mobile station 50 detects that it has changed location and stopped moving, it may wait a predetermined amount of time. If the mobile station 50 has not again changed location within that time, then the mobile station 50 may check the availability of the second radio network 54. This can allow the mobile station 50 to check the availability of the second radio network 54 after the mobile station 50 has stopped moving. This may help prevent a moving mobile station from checking and finding that the second radio network 54 is available but then continuing to move through the coverage area of the second radio network 54 such that the second radio network 54 is no longer available.

If the second radio network 54 is available, the mobile station 50 may then begin communicating with the second radio network 54. If the second radio network 54 is an IEEE 802.11 network, for example, the mobile station 50 may associate with an access point for the 802.11 network. The mobile station 50 may then exchange voice, data or other traffic over the second radio network 54. As previously described, the second radio network 54 may have faster access speeds, lower costs or other factors that make using the second radio network 54 preferable to using the first radio network 52. Thus, when the second radio network 54 is available, the mobile station may preferably use the second radio network 54.

It should be understood, however, that although the second radio network 54 may be available, the mobile station 50 might continue to use the first radio network 52 as well. For example, the first radio network 52 may be a WWAN that provides both voice and data services. If the second radio network 54 is available, the mobile station 50 might switch to using the second radio network 54 for data services while continuing to use the first radio network 52 for voice services. Alternatively, the mobile station 50 might use the second radio network 54 for data services while continuing to use the first radio network 52 for both voice and data services, thereby potentially achieving a faster data rate than could be achieved from using either one of the radio networks individually for data services. These are merely examples for coordinated use of both radio networks, and other divisions of services between the first and second radio networks 52, 54 are also possible.

The mobile station 50 may perform a variety of other events in response to determining it has changed location and thereafter stopped moving. These other events may be in addition to, or in place of, checking the availability of the second radio network 54. For example, the mobile station 50 may perform an active power handoff. In another example, the mobile station 50 may perform a seamless service handoff. In another example, the mobile station 50 may sound an alarm used to restrict the movement of the mobile station 50. These are merely examples, and many other events might also be performed in response to this determination.

Figure 6:
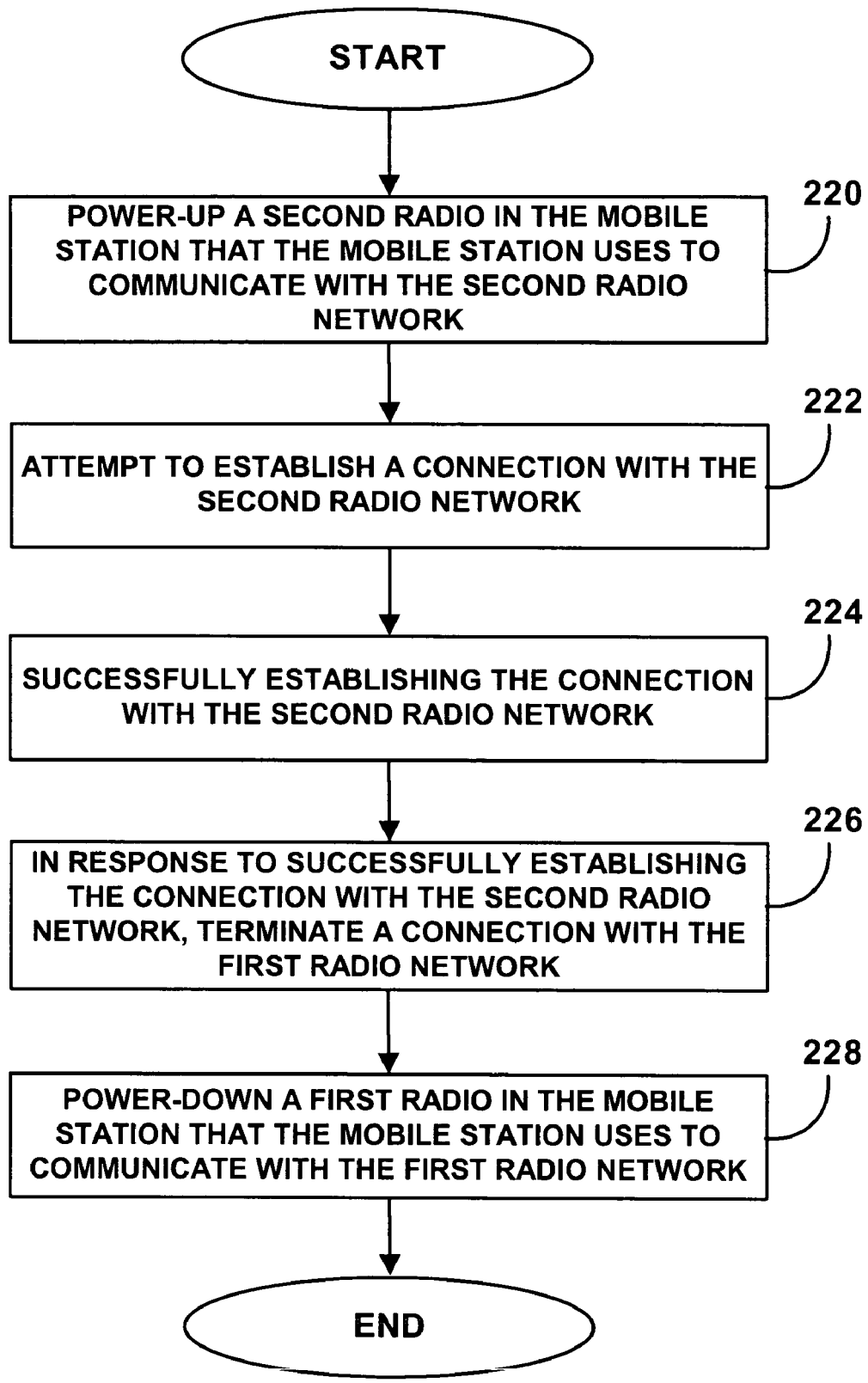
FIG. 6 is a flowchart of an exemplary process that the mobile station can use to check the availability of the second radio network.

FIG. 6 is a flowchart of an exemplary process that the mobile station can use to check the availability of the second radio network 54. This process may be used, for example, as Step 202 of FIG. 5 when the predetermined action is checking for the availability of the second radio network 54. At Step 220, the mobile station powers up a second radio in the mobile station that the mobile station uses to communicate with the second radio network. As previously described, the second radio 172 may be an integrated component in the mobile station 50, such is in a chip or other circuitry in the mobile station 50. Alternatively, the second radio 172 may be a removable component.

At Step 222, the mobile station attempts to establish a connection with the second radio network 54. At Step 224, the mobile station successfully establishes a connection with the second radio network 54. At Step 226, in response to successfully establishing the connection with the second radio network 54, the mobile station terminates a connection with the first radio network 52. At Step 228, the mobile station powers-down a first radio in the mobile station that the mobile station uses to communicate with the first radio network 52.

It should be understood, however, that many variations may be made to this process. For example, the mobile station 50 may keep its connection with the first radio network 52 in addition to establishing its connection with the second radio network 54. In this case, the mobile station 50 might not terminate its connection with the first radio network 52 and power-down the first radio 170. Thus, the mobile station 50 might not perform Steps 226 and 228. Alternatively, the mobile station 50 might not have an established connection with the first radio network 52 when the mobile station 50 establishes its connection with the second radio network 54. In this case, the mobile station 50 might also not perform Steps 226 and 228. Other variations are also possible.

Figure 7:
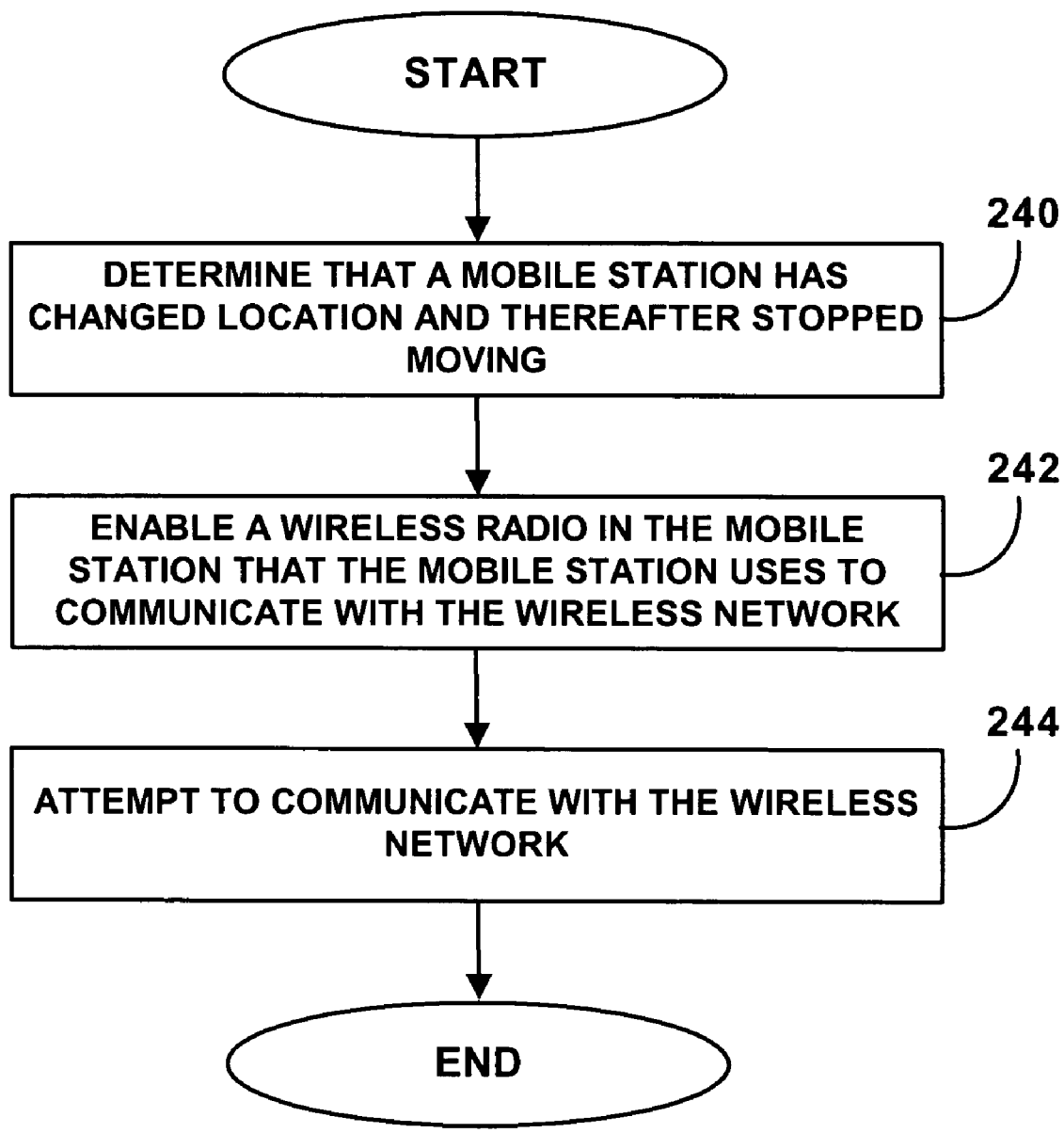
FIG. 7 is a flowchart of an exemplary process that a mobile station can use to switch between communicating with a WWAN and a wireless network other than a WWAN.

FIG. 7 is a flowchart of an exemplary process that a mobile station can use to switch between communicating with a WWAN and a wireless network other than a WWAN. At Step 240, the mobile station determines that the mobile station has changed location and thereafter stopped moving. At Step 242, the mobile station enables a wireless radio in the mobile station that the mobile station uses to communicate with the wireless network. Then, at Step 244, the mobile station attempts to communicate with the wireless network.

Figure 8:
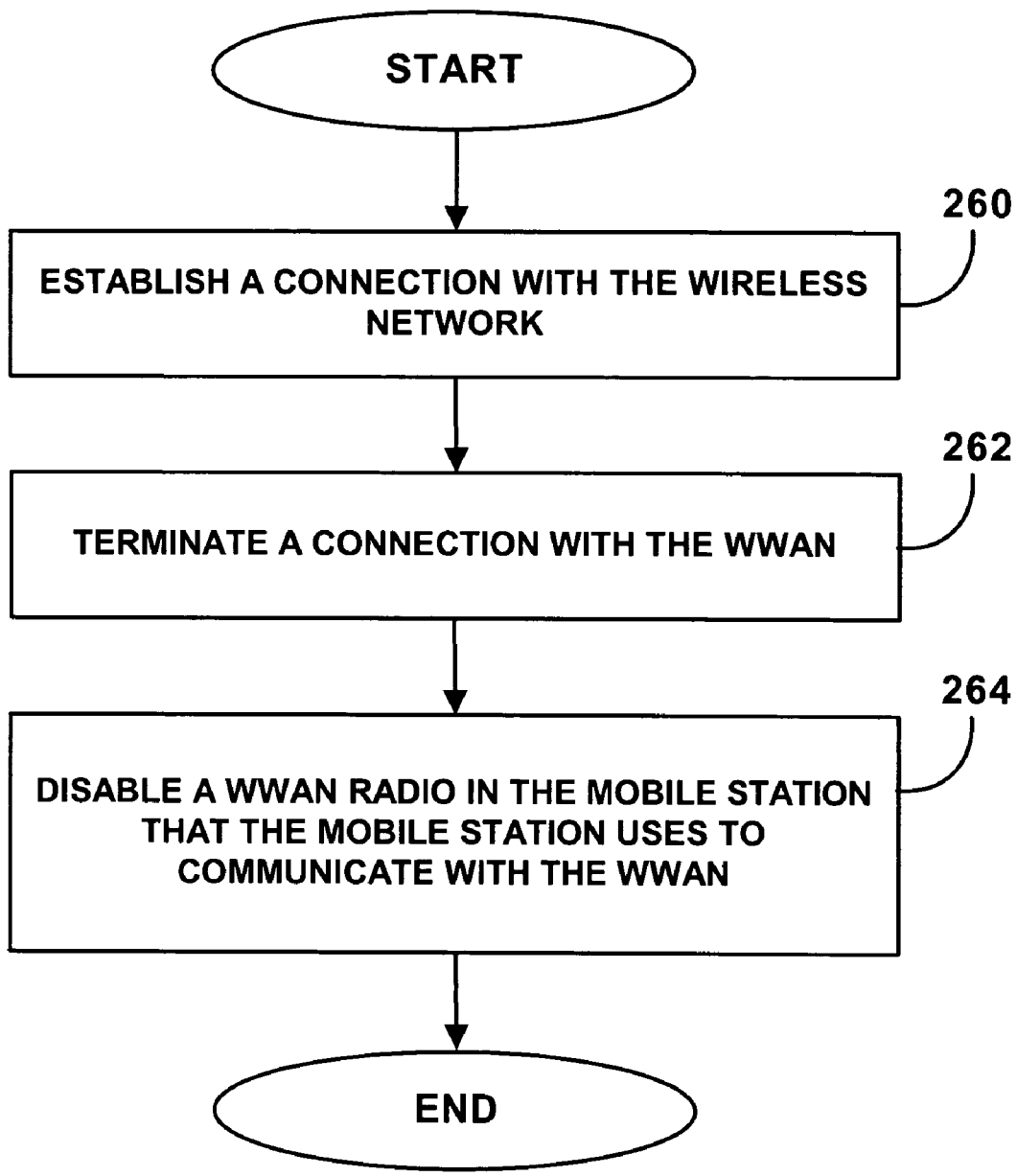
FIG. 8 is a flowchart of an exemplary process that the mobile station can use in conjunction with the process described in FIG. 7 when the network other than a WWAN is available.

FIG. 8 is a flowchart of an exemplary process that the mobile station can use in conjunction with the process described in FIG. 7 when the network other than a WWAN is available. Thus, where the wireless network is available, the flow of the process depicted in FIG. 7 might continue to this process. At Step 260, the mobile station establishes a connection with the wireless network. At Step 262, the mobile station terminates a connection with the WWAN. At Step 264, the mobile station disables a WWAN radio in the mobile station that the mobile station uses to communicate with the WWAN. However, if the mobile station 50 were going to continue communicating with the WWAN, then the mobile station 50 might not terminate a connection with the WWAN and might not disable the WWAN radio. Thus, if the mobile station 50 were to continue communicating with the WWAN, then the mobile station might not perform Steps 262 and 264.

Figure 9:
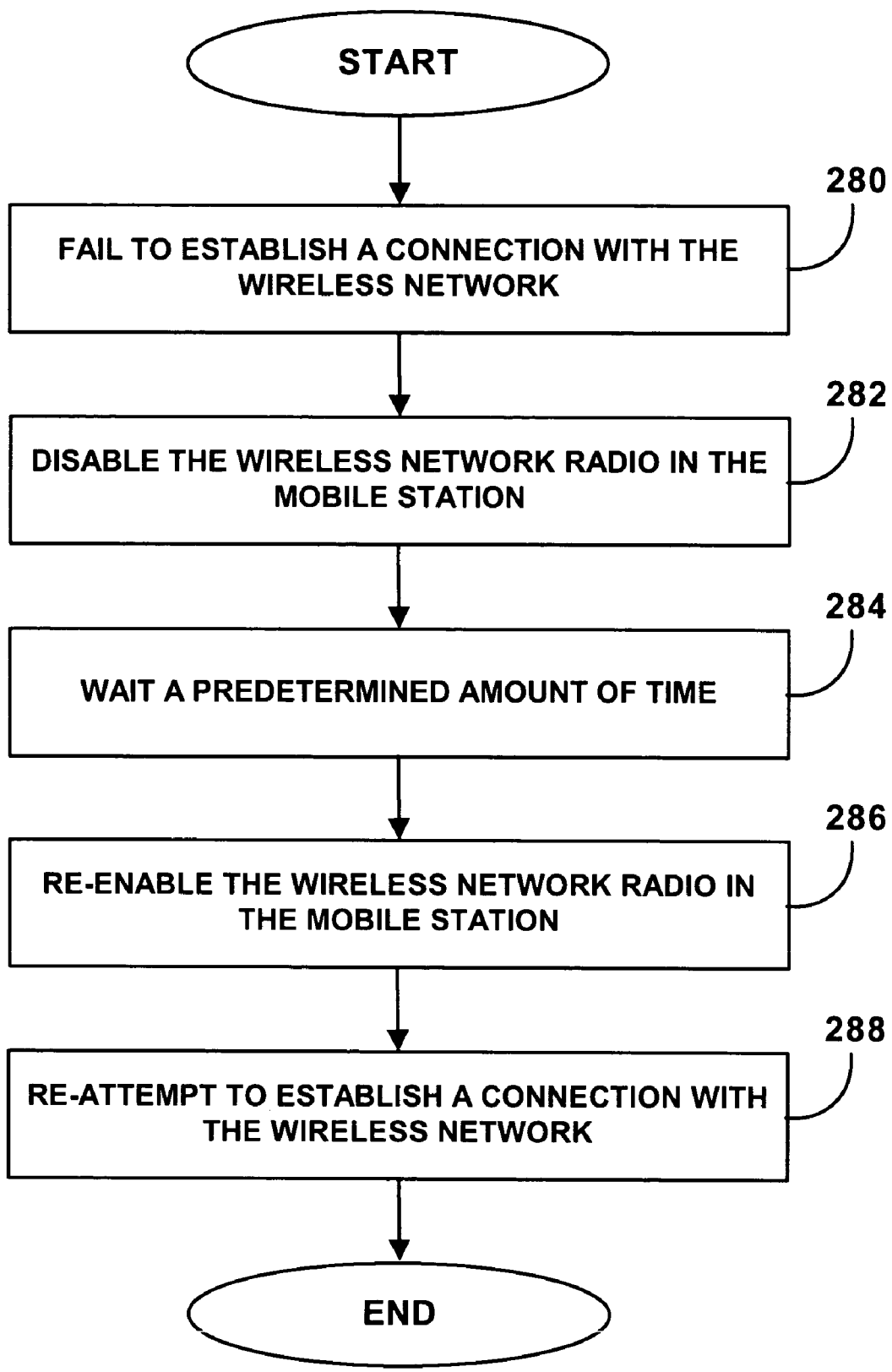
FIG. 9 is a flowchart of an exemplary process that the mobile station can use in conjunction with the process described in FIG. 7 when the network other than a WWAN is not available.

FIG. 9 is a flowchart of an exemplary process that the mobile station can use in conjunction with the process described in FIG. 7 when the network other than a WWAN is not available. Thus, where the wireless network is not available, the flow of the process in FIG. 7 might continue to this process. At Step 280 the mobile station fails to establish a connection with the wireless network. At Step 282, the mobile station disables the wireless network radio in the mobile station. At Step 284, the mobile station waits a predetermined amount of time. At Step 286, the mobile station re-enables the wireless network radio in the mobile station. At Step 288, the mobile station attempts to again establish a connection with the wireless network.

Thus, when the wireless network is not available and therefore the mobile station 50 cannot establish a connection with the wireless network, the mobile station 50 may disable the wireless network radio in the mobile station 50. This may conserve battery power over continually leaving the wireless network radio on. However, the mobile station 50 may subsequently attempt to establish a connection with the wireless network. Before again enabling the wireless network radio and attempting to establish a connection with the wireless network, the mobile station 50 may wait a predetermined amount of time. The predetermined time may be set, for example, to conserve battery power while still allowing the mobile station 50 to check the availability of the wireless network at routine intervals.

Having the mobile station 50 again attempt to establish a connection with the wireless network after a predetermined amount of time may help to prevent the mobile station 50 from coming within range of the wireless network but not detecting a change in location that would cause the mobile station 50 to automatically attempt to establish a connection with the wireless network. In an alternate embodiment, the mobile station 50 may again attempt to establish a connection with the wireless network after either waiting for the predetermined amount of time or again detecting a change in its location. Thus, the first of these events to occur would cause the mobile station 50 to again power-up the wireless network radio module and attempt to connect to the wireless network. Still alternatively, the mobile station 50 may be programmed to again attempt to establish a connection with the wireless network only after detecting another change in location. These are merely examples, and other events may also be programmed that would trigger the mobile station to again attempt to establish a connection with the wireless network.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method comprising:
   detecting that a mobile station communicating with a first radio network has changed location and thereafter stopped moving, wherein the first radio network is a wireless wide area network (WWAN); and
   in response to detecting that the mobile station has changed location and thereafter stopped moving, performing a predetermined action, wherein the predetermined action comprises checking for availability of a wireless local area network (WLAN).

2. A computer readable medium having stored therein instructions for causing a processor to execute the method of claim 1.

3. The method of claim 1, wherein detecting that the mobile station has changed location and thereafter stopped moving comprises:
   detecting that the mobile station has changed location; and
   determining that the mobile station has not thereafter changed location again within a predetermined amount of time.

4. The method of claim 1, wherein detecting that the mobile station has changed location and thereafter stopped moving comprises detecting that the mobile station has changed location within a predetermined amount of time.

5. The method of claim 1, wherein the mobile station communicates with a plurality of base stations in the WWAN, and wherein detecting that the mobile station has changed location and thereafter stopped moving comprises detecting that the mobile station is communicating with an additional base station not in the plurality of base stations.

6. The method of claim 1, wherein the mobile station communicates with a plurality of base stations in the WWAN, and wherein detecting that the mobile station has changed location and thereafter stopped moving comprises determining that the mobile station is no longer communicating with one of the base stations in the plurality of base stations.

7. The method of claim 1, wherein the mobile station communicates with a plurality of base stations in the WWAN, and wherein detecting that the mobile station has changed location and thereafter stopped moving comprises detecting a handoff of the mobile station between base stations.

8. The method of claim 1, wherein the mobile station communicates with a plurality of base stations in the WWAN, and wherein detecting that the mobile station has changed location and thereafter stopped moving comprises detecting a change in relative strengths of pilot signals of base stations in the plurality of base stations.

9. The method of claim 1, wherein the predetermined action comprises performing an active power handoff of the mobile station.

10. The method of claim 1, wherein the predetermined action comprises performing a seamless service handoff of the mobile station.

11. The method of claim 1, wherein checking for availability of a WLAN comprises:
powering up a second radio in the mobile station, wherein the mobile station uses the second radio to communicate with the WLAN;
attempting to establish a connection with the WLAN;
successfully establishing the connection with the WLAN;
in response to successfully establishing the connection with the WLAN, terminating a connection with the WWAN; and
powering down a first radio in the mobile station, wherein the mobile station uses the first radio to communicate with the WWAN.

12. The method of claim 1, wherein the WLAN is an IEEE 802.11 network, a HomeRF network, a HiperLAN, and MMDS network or a Bluetooth network.

13. A method comprising:
determining that a mobile station communicating with a wireless wide area network (WWAN) has changed location and thereafter stopped moving;
enabling a wireless local area network (WLAN) radio in the mobile station, wherein the mobile station uses the WLAN radio to communicate with a WLAN and attempting to communicate with the WLAN.

14. A computer readable medium having stored therein instructions for causing a processor to execute the method of claim 13.

15. The method of claim 13 further comprising:
establishing a connection with the WLAN;
terminating a connection with the WWAN; and
disabling a WWAN radio in the mobile station, wherein the mobile station uses the WWAN radio to communicate with the WWAN.

16. The method of claim 13, further comprising:
failing to establish a connection with the WLAN;
disabling the WLAN radio in the mobile station;
waiting a predetermined period of time;
re-enabling the WLAN radio in the mobile station; and
re-attempting to establish a connection with the WLAN.

17. The method of claim 13, wherein the WWAN is a CDMA, WCDMA, TDMA or GSM network.

18. The method of claim 13, wherein the WLAN is an IEEE 802.11 network, a HomeRF network, a HiperLAN, a MMDS network or a Bluetooth network.

19. A mobile station comprising:
a processor;
a memory;
a first radio for communicating with a first radio network;
logic stored in the memory and executable on the processor to (i) determine that the mobile station has changed location and thereafter stopped moving, and (ii) in response to determining that the mobile station has changed location and thereafter stopped moving, performing a predetermined action.

20. The mobile station of claim 19, further comprising:
a second radio for communicating with a second radio network; and
logic stored in the memory and executable on the processor to (i) in response to determining that the mobile station has changed location and thereafter stopped moving, enabling the second radio, and (ii) attempting to communicate with the second radio network using the second radio.

21. The mobile station of claim 20, further including logic stored in the memory and executable by the processor to (i) determine that the mobile station successfully communicated with the second radio network, and (ii) power down the first radio.

22. The mobile station of claim 20, wherein the second radio is a removable wireless radio module.

23. The mobile station of claim 20, wherein the first radio network is a WWAN and wherein the second radio network is an IEEE 802.11 network, a HomeRF network, a HiperLAN, a MMDS network or a Bluetooth network.

* * * * *